United States Patent
Hwang et al.

(10) Patent No.: US 8,675,155 B2
(45) Date of Patent: Mar. 18, 2014

(54) LIQUID CRYSTAL DISPLAY DEVICE COMPRISING A FIRST POLARIZING PLATE WITH A CUT PORTION FORMED DIRECTLY BELOW A DRIVING CHIP WHEREIN THE CUT PORTION IS COVERED BY A BOTTOM SURFACE OF A FIRST SUBSTRATE

(75) Inventors: Jeong-Ho Hwang, Yongin (KR); Young-Bee Chu, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 262 days.

(21) Appl. No.: 13/079,154

(22) Filed: Apr. 4, 2011

(65) Prior Publication Data

US 2012/0154710 A1 Jun. 21, 2012

(30) Foreign Application Priority Data

Dec. 15, 2010 (KR) ........................ 10-2010-0128619

(51) Int. Cl.
*G02F 1/1335* (2006.01)
*G02F 1/1345* (2006.01)

(52) U.S. Cl.
USPC ............................................ 349/96; 349/151

(58) Field of Classification Search
USPC .......................................... 349/96, 149–152
See application file for complete search history.

(56) References Cited

U.S. PATENT DOCUMENTS

| | | |
|---|---|---|
| 5,847,796 A | 12/1998 | Uchiyama et al. |
| 2007/0085962 A1* | 4/2007 | Yoshioka ...................... 349/149 |
| 2008/0143949 A1* | 6/2008 | Ino ................. 349/151 |
| 2009/0096047 A1* | 4/2009 | Jao et al. ....................... 257/432 |
| 2010/0045891 A1* | 2/2010 | Oh .................. 349/58 |

FOREIGN PATENT DOCUMENTS

| | | |
|---|---|---|
| JP | 2005-165368 A | 6/2005 |
| KR | 10-2006-0132130 A | 12/2006 |
| KR | 10-2008-0086636 A | 9/2008 |
| KR | 10-2010-0033258 A | 3/2010 |

* cited by examiner

*Primary Examiner* — Paul Lee
(74) *Attorney, Agent, or Firm* — Knobbe, Martens, Olson & Bear, LLP

(57) ABSTRACT

A liquid crystal display device is disclosed. In one embodiment, the device includes: a panel having a first substrate and a second substrate with a liquid crystal layer interposed therebetween, and a first polarizing plate and a second polarizing plate, respectively, attached on the exterior surfaces of the first substrate and the second substrate. The device may further include a driving chip installed in a boundary of the first substrate at the opposite surface of the first substrate onto which the first polarizing plate is attached, wherein the first polarizing plate covers the boundary of the first substrate and has a cut portion corresponding to the first substrate in which the driving chip is installed.

8 Claims, 3 Drawing Sheets

LIQUID CRYSTAL DISPLAY DEVICE COMPRISING A FIRST POLARIZING PLATE WITH A CUT PORTION FORMED DIRECTLY BELOW A DRIVING CHIP WHEREIN THE CUT PORTION IS COVERED BY A BOTTOM SURFACE OF A FIRST SUBSTRATE

CROSS-REFERENCE TO RELATED PATENT APPLICATION

This application claims the benefit of Korean Patent Application No. 10-2010-0128619, filed on Dec. 15, 2010, in the Korean Intellectual Property Office, the disclosure of which is incorporated herein in its entirety by reference.

BACKGROUND

1. Field

The described technology generally relates to a liquid crystal display, and more particularly to, a liquid crystal display having an improved structure of a polarizing plate and a method of manufacturing the liquid crystal display.

2. Description of the Related Technology

In general, a liquid crystal display (LCD) is one type of flat panel display that displays an image by adjusting an amount of transmitted light beam so as to correspond to an image signal. In particular, the LCD increasingly has a wide application range since it is lightweight, and has a thin profile and reduced power consumption.

Such an LCD includes a panel including first and second substrates with a liquid crystal layer interposed therebetween and polarizing plates attached to the exterior surfaces of the first and second substrates, respectively, and a backlight unit that supplies backlight to the panel. In this regard, the first substrate includes a thin film transistor (TFT) and thus referred to as a TFT substrate, and the second substrate includes a color filter and thus referred to as a color filter substrate.

SUMMARY

One inventive aspect is a liquid crystal display device having an improved structure of a polarizing plate to facilitate installation of a driving chip in a substrate.

Another aspect is a liquid crystal display device including: a panel comprising a first substrate and a second substrate with a liquid crystal layer interposed therebetween, and a first polarizing plate and a second polarizing plate, respectively, attached on the exterior surfaces of the first substrate and the second substrate; a driving chip installed in a boundary of the first substrate at the opposite surface of the first substrate onto which the first polarizing plate is attached; and a backlight unit for irradiating backlight to the panel, wherein the first polarizing plate covers the boundary of the first substrate and has a cut portion corresponding to the first substrate in which the driving chip is installed.

The driving chip may be attached onto the first substrate with a first double-sided tape interposed therebetween.

A shape of the cut portion of the first polarizing plate may include a rectangular shape or a circular shape.

The liquid crystal display device may further include: a mold frame for surrounding the backlight unit, wherein the first polarizing plate is attached onto the mold frame and the backlight unit with a second double-sided tape interposed therebetween.

The liquid crystal display device may further include: a flexible circuit substrate connected to the first substrate.

Another aspect is a method of manufacturing a liquid crystal display device, the method including: attaching a first polarizing plate and a second polarizing plate, respectively, on the exterior surfaces of a first substrate and a second substrate with a liquid crystal layer interposed therebetween; installing a driving chip in a boundary of the first substrate at the opposite surface of the first substrate onto which the first polarizing plate is attached; and attaching a backlight unit onto the first polarizing plate at the opposite side of the first substrate, wherein the first polarizing plate covers the boundary of the first substrate and has a cut portion corresponding to the first substrate in which the driving chip is installed.

The driving chip may be attached onto the first substrate with a first double-sided tape interposed therebetween.

A shape of the cut portion of the first polarizing plate may include a rectangular shape or a circular shape.

The method may further include: installing a mold frame for surrounding the backlight unit, wherein the first polarizing plate is attached onto the mold frame and the backlight unit with a second double-sided tape interposed therebetween.

The method may further include: installing a flexible circuit substrate in the first substrate.

DETAILED DESCRIPTION

In an LCD, a driving chip is generally installed in a first substrate of the panel by disposing a double-sided adhesive film on the first substrate and pressing and attaching the driving chip onto the double-sided adhesive film. That is, the panel is placed on a stage in such a way that a polarizing plate of the first substrate is disposed downside and the double-sided adhesive film is disposed on an opposite surface of the polarizing plate so as to attach the driving chip onto the first substrate.

However, when the driving chip is pressed and attached onto the first substrate, since the polarizing plate directly contacting the stage slides, the driving chip is frequently not accurately attached onto the first substrate. That is, since the polarizing plate is generally formed of a soft and slippery material having a low coefficient of friction, when the driving chip is pressed and attached onto the first substrate, the polarizing plate does not provide adequate side support and slides from the stage. In this case, the driving chip is not attached at an accurate position and gets out of the position thereof, which increases a possibility of an occurrence of a defective product.

To solve this problem, one might consider a method of attaching the driving chip onto the first substrate and then attaching the polarizing plate onto the first substrate may be considered. However, defects quite frequently occur in the process of attaching the polarizing plate onto the first substrate. Thus, if the driving chip is attached to the first substrate where the polarizing plate is not properly attached, the entire process likely ends in failure, resulting in increased manufacturing costs.

Hereinafter, embodiments will be described in greater detail with reference to the accompanying drawings.

Figure 1:
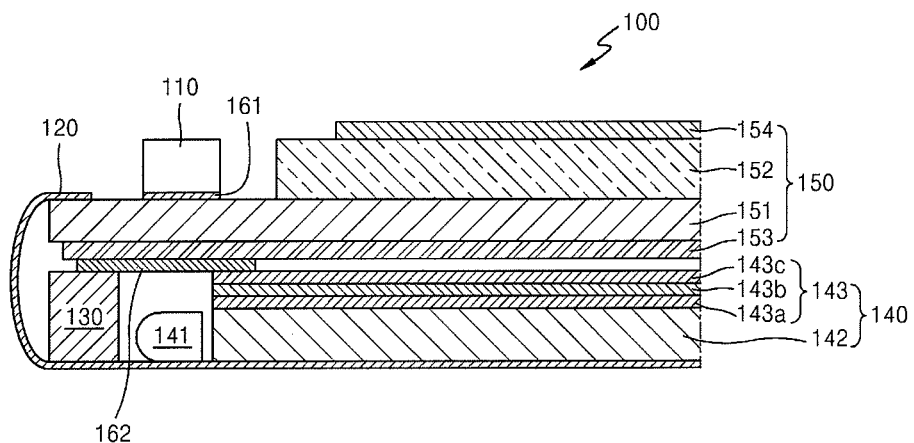
FIG. 1 is a cross-sectional view of a liquid crystal display device according to an embodiment.

FIG. 1 is a cross-sectional view of a liquid crystal display device 100 according to an embodiment.

Referring to FIG. 1, the liquid crystal display device 100 includes a panel 150 on which an image is realized, a backlight unit 140 that supplies light to the panel 150, and a mold frame 130 that supports the backlight unit 140, and forms the image by selectively penetrating the light supplied by the backlight unit 140 through the panel 150. A chassis (not shown) that forms an exterior frame may be installed in the outside of the mold frame 130.

The backlight unit 140 includes a lamp 141, a light guide plate 142, and an optical sheet 143.

The light guide plate 142 guides light incident from the lamp 141 and delivers the light toward the panel 150.

The optical sheet 143 allows light emitted from the light guide plate 142 incident into the panel 150. In one embodiment, the optical sheet 143 includes a diffusion sheet 143a that diffuses light, a prism sheet 143b that converts a progress angle of the light to be substantially perpendicular to the panel 150, and a protection sheet 143c that protects the surface of the prism sheet 143b.

Next, the panel 150 includes a thin film transistor (TFT) substrate (hereinafter to be interchangeably used with a first substrate) 151 and a color filter substrate (hereinafter to be interchangeably used with a second substrate) 152 that are adhered to each other with a liquid crystal layer 155 (refer to FIG. 2) interposed therebetween, and first and second polarizing plates 153 and 154 that are attached to the exterior surfaces of the first and second substrates 151 and 152, respectively.

Figure 2:
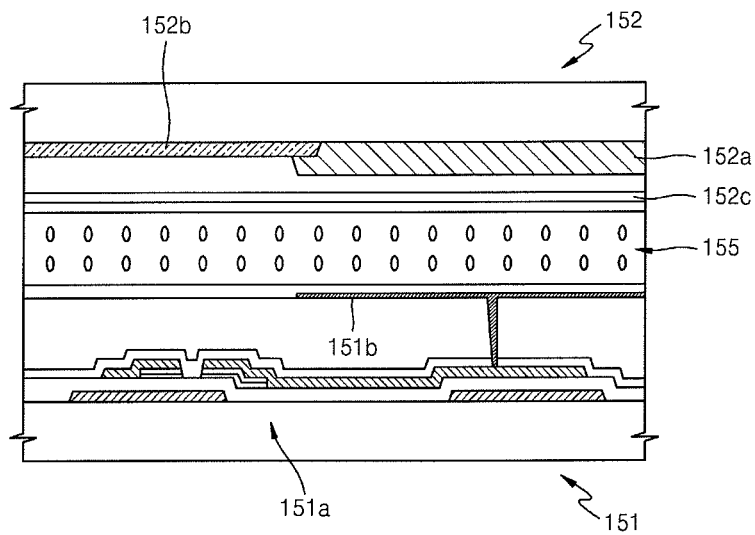
FIG. 2 is a magnified cross-sectional view of first and second substrates of FIG. 1 that are adhered to each other.

FIG. 2 is a magnified cross-sectional view of the first and second substrates 151 and 152 that are adhered to each other. In one embodiment, as shown in FIG. 2, the first substrate 151 includes a TFT 151a and a pixel electrode 151b.

In one embodiment, as shown in FIG. 2, the second substrate 152 includes a color filter 152a for realizing a color, a black matrix 152b for preventing light from leaking, and a common electrode 152c that faces the pixel electrode 151b.

The first polarizing plate 153 is attached onto the exterior surface of the first substrate 151. The second polarizing plate 154 is attached onto the exterior surface of the second substrate 152.

In one embodiment, as shown in FIG. 1, the width of the first substrate 151 is greater than that of the second substrate 152. A driving chip 110 for controlling the panel 150 is installed in a boundary of the first substrate 151 that is relatively longer than the second substrate 152. The driving chip 110 is attached onto the first substrate 151 with a double-sided tape (hereinafter referred to as a first double-sided tape) 161, such as an anisotropic conductive film, interposed therebetween.

The first polarizing plate 153 covers the boundary of the first substrate 151 in which the driving chip 110 is installed. A cutting portion 153a (refer to FIG. 3) is formed in a direct lower region corresponding to a location where the driving chip 110 is installed in the first substrate 151.

Figure 3:
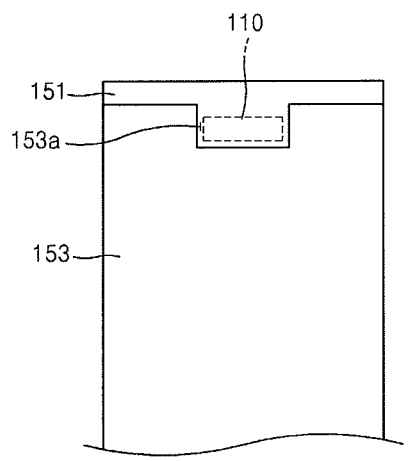
FIG. 3 is a rear view of a panel including a cutting portion of a first polarizing plate of FIG. 1.

In one embodiment, as shown in FIG. 3, the cutting portion 153a has a rectangular shape. When the driving chip 110 is pressed and attached onto the first substrate 151, the cutting portion 153a supports a pressure of the driving chip 110 at the opposite side. In one embodiment, the first substrate 151 formed of, for example, a glass material, rather than the first polarizing plate 153 formed of for example, a slippery material, is exposed through the cutting portion 153a, in order to prevent the driving chip 110 from sliding when the driving chip 110 is attached on the first substrate 151.

In other words, when a pressure is applied to the driving chip 110 so as to attach the driving chip 110 onto the first substrate 151 with the first double-sided tape 161 interposed between the driving chip 110 and the first substrate 151, if the first polarizing plate 153 supports the pressure at the opposite side, the driving chip 110 may easily slid. Thus, a corresponding region of the first substrate 151 is cut, the first substrate 151 is exposed through the cut region, and a friction increases, and thus the driving chip 110 does not slid.

A flexible circuit substrate 120 is attached onto the first substrate 151 to connect the driving chip 110 and a circuit.

A method of manufacturing the liquid crystal display device 100 including a process of attaching the driving chip 110 onto the first substrate 151 will now be described.

The first substrate 151 and the second substrate 152 that are adhered to each other with the liquid crystal layer 155 interposed therebetween is prepared.

The first and second polarizing plates 153 and 154 are attached on the exterior surfaces of the first and second substrates 151 and 152, respectively. The first polarizing plate 153 is installed to cover the boundary of the first substrate 151. The cutting portion 153a of FIG. 3 is formed in a region corresponding to a location where the driving chip 110 is to be attached.

Thereafter, the panel 150 in combination of the first and second substrates 151 and 152 and the first and second polarizing plates 153 and 154 is placed on a stage (not shown) in such a way that the first polarizing plate 153 is disposed downside, and the driving chip 110 is attached onto the first substrate 151.

That is, the first double-sided tape 161, such as an anisotropic conductive film, is attached to the boundary of the first substrate 151, and then the driving chip 110 is pressed and attached thereon. The first substrate 151 is exposed through the cutting portion 153a formed in a direct lower region corresponding to the driving chip 110, and thus the pressure supports a friction between the first substrate 151 and a stage (not shown).

Therefore, the first substrate 151 formed of a glass material having a higher coefficient of friction than the first polarizing plate 153 formed of a slippery material supports the pressure, thereby preventing the driving chip 110 from sliding when the driving chip 110 is attached onto the first substrate 151, and accordingly solving a problem of the driving chip 110 that gets out of its location due to sliding.

The cutting portion 153a formed in the first polarizing plate 153 allows the driving chip 110 to be viewed through the first substrate 151 formed of the transparent glass material from the stage, and thus the location of the driving chip 110 can be easily arranged by installing a location sensor in the stage.

After the driving chip 110 is attached, the panel 150 is attached onto the backlight unit 140 and the mold frame 130. In more detail, a second double-sided tape 162 is adhered to the backlight unit 140 and the mold frame 130 and then the panel 150 is attached onto the second double-sided tape 162.

The flexible circuit substrate 120 is connected to the first substrate 151.

In conclusion, the liquid crystal display device 100 manufactured as described above prevents the driving chip 110 from sliding when the driving chip 110 is attached onto the first substrate 151, thereby solving a problem of the driving chip 110 that gets out of its location due to sliding.

Figure 4:
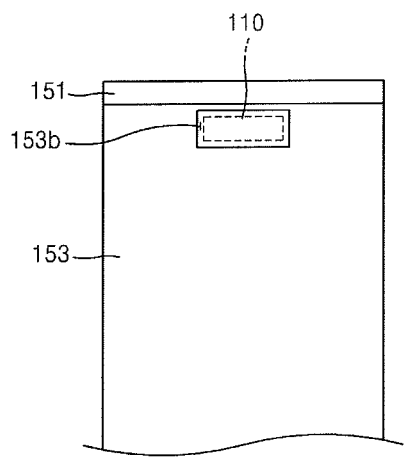
FIGS. 4 and 5 are rear views of modifications of the cutting portion of FIG. 3.
Figure 5:
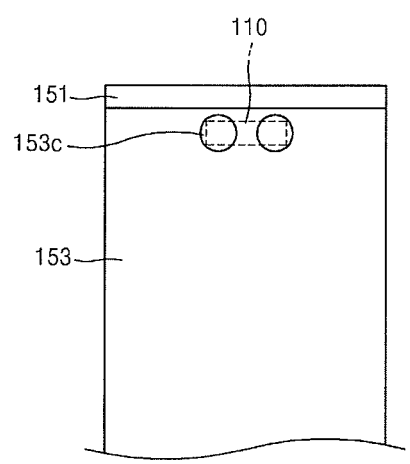

Meanwhile, the cutting portion 153a may be modified in various ways as shown in FIGS. 4 and 5, i.e. a rectangular cutting portion 153b of FIG. 4 and a plurality of circular cutting portions 153c of FIG. 5. In another embodiment, the cutting portion 153a has other shapes such as triangle, pentagon or other polygon, as long as the first substrate 151 is exposed by cutting a part of the first polarizing plate 153 in order to support a pressure by using friction increased at the opposite side of the driving chip 110.

According to at least one of the disclosed embodiments, a polarizing plate does not slid when a driving chip is attached onto a substrate, which prevents the driving chip from getting out of its location.

While the disclosure has been particularly shown and described with reference to certain embodiments thereof, it will be understood by those of ordinary skill in the art that various changes in form and details may be made therein without departing from the spirit and scope of the appended claims.

What is claimed is:

1. A liquid crystal display device comprising:
   a panel comprising a first substrate and a second substrate with a liquid crystal layer interposed therebetween, and a first polarizing plate and a second polarizing plate, respectively, attached on the exterior surfaces of the first and second substrates, wherein the first substrate comprises top and bottom surfaces opposing each other, wherein the first polarizing plate comprises top and bottom surfaces opposing each other, and wherein the top surface of the first polarizing plate contacts the bottom surface of the first substrate;
   a driving chip formed on the top surface of the first substrate; and
   a backlight unit configured to irradiate backlight to the panel,
   wherein the first polarizing plate has a cut portion formed substantially directly below the driving chip, and wherein the cut portion is covered by the bottom surface of the first substrate.

2. The liquid crystal display device of claim 1, wherein the driving chip is attached onto the first substrate with a first double-sided tape interposed therebetween.

3. The liquid crystal display device of claim 1, wherein the cut portion has a rectangular shape, a circular shape or other polygonal shape.

4. The liquid crystal display device of claim 1, further comprising: a mold frame configured to surround the backlight unit,
   wherein the first polarizing plate is attached onto the mold frame and the backlight unit with a second double-sided tape interposed therebetween.

5. The liquid crystal display device of claim 1, further comprising: a flexible circuit substrate connected to the first substrate.

6. The liquid crystal display device of claim 1, wherein the first substrate comprises a linear edge portion corresponding to the width or length of the first polarizing plate, wherein the first polarizing plate does not cover the linear edge portion of the first substrate, and wherein the driving chip is not formed directly above the linear edge portion.

7. The liquid crystal display device of claim 1, wherein the first substrate comprises a linear edge portion corresponding to the width or length of the first polarizing plate, wherein the first polarizing plate does not cover the linear edge portion of the first substrate, and wherein the cut portion of the first polarizing plate is not formed directly below the linear edge portion of the first substrate.

8. The liquid crystal display device of claim 1, wherein the first polarizing plate has a width and a length, and wherein the cut portion has a size less than the width or length of the first polarizing plate.

* * * * *